(12) United States Patent
Ellis

(10) Patent No.: US 11,718,169 B2
(45) Date of Patent: *Aug. 8, 2023

(54) FAILSAFE DEVICES, INCLUDING TRANSPORTATION VEHICLES

(71) Applicant: Frampton E. Ellis, Jasper, FL (US)

(72) Inventor: Frampton E. Ellis, Jasper, FL (US)

( * ) Notice: Subject to any disclaimer, the term of this patent is extended or adjusted under 35 U.S.C. 154(b) by 520 days.

This patent is subject to a terminal disclaimer.

(21) Appl. No.: 16/858,073

(22) Filed: Apr. 24, 2020

(65) Prior Publication Data

US 2020/0247228 A1 Aug. 6, 2020

Related U.S. Application Data

(63) Continuation of application No. 16/386,380, filed on Apr. 17, 2019, now Pat. No. 10,675,961, which is a continuation of application No. 14/185,686, filed on Feb. 20, 2014, now Pat. No. 10,300,779.

(60) Provisional application No. 61/852,039, filed on Mar. 15, 2013, provisional application No. 61/851,206, filed on Mar. 4, 2013, provisional application No. 61/851,084, filed on Mar. 1, 2013, provisional application No. 61/850,947, filed on Feb. 27, 2013, provisional application No. 61/850,825, filed on Feb. 25, 2013, provisional application No. 61/850,746, filed on Feb. 22, 2013.

(51) Int. Cl.
| | |
|---|---|
| *B60K 6/365* | (2007.10) |
| *B60K 6/445* | (2007.10) |
| *B60W 50/02* | (2012.01) |
| *B60W 20/50* | (2016.01) |

(52) U.S. Cl.
CPC .............. *B60K 6/365* (2013.01); *B60K 6/445* (2013.01); *B60W 20/50* (2013.01); *B60W 50/02* (2013.01); *Y02T 10/62* (2013.01)

(58) Field of Classification Search
CPC ....... B60K 6/365; B60K 6/445; B60W 20/50; B60W 50/02; Y02T 10/62
See application file for complete search history.

(56) References Cited

U.S. PATENT DOCUMENTS

| | | | |
|---|---|---|---|
| 3,655,992 | A | 4/1972 | Ohno et al. |
| 4,041,696 | A | 8/1977 | Morrison |
| 4,310,889 | A | 1/1982 | Imai et al. |
| 4,469,080 | A | 9/1984 | Brunner et al. |
| 4,609,984 | A | 9/1986 | Strosser et al. |
| 4,886,291 | A * | 12/1989 | Okamoto ........... B60G 17/0185 280/5.504 |
| 4,910,494 | A | 3/1990 | Tamai |
| 5,146,892 | A | 9/1992 | Krampe et al. |
| 5,415,056 | A | 5/1995 | Tabata et al. |

(Continued)

*Primary Examiner* — Sze-Hon Kong
(74) *Attorney, Agent, or Firm* — Mendelsohn Dunleavy, P.C.

(57) ABSTRACT

A failsafe device is provided to perform an operation including at least a part or all of one or more of a mechanical system, a hydraulic system, an electrical system, and a chemical system. The failsafe device includes at least one electronic system and an least one non-electronic system. The at least one electronic system is controlled by at least one computer and/or microprocessor. The at least one non-electronic system includes at least one of the mechanical, hydraulic, electrical, and chemical systems. The failsafe device is configured to operate in two modes, a normal mode and an emergency mode.

20 Claims, 13 Drawing Sheets

Four Wheel Drive Hybrid powertrain with separate driving axles

(56) References Cited

U.S. PATENT DOCUMENTS

| | | | |
|---|---|---|---|
| 5,544,538 A * | 8/1996 | Takagi | F16H 61/0251 |
| | | | 137/596.1 |
| 6,230,094 B1 | 5/2001 | Ohashi et al. | |
| 8,272,987 B2 | 9/2012 | Tiwari et al. | |
| 10,300,779 B2 | 5/2019 | Ellis | |
| 2002/0099487 A1 * | 7/2002 | Suganuma | B60R 16/0232 |
| | | | 701/1 |
| 2002/0163198 A1 | 11/2002 | Gee | |
| 2004/0194498 A1 | 10/2004 | Burchill et al. | |
| 2004/0243287 A1 * | 12/2004 | Yanaka | B60W 50/02 |
| | | | 701/33.6 |
| 2006/0015231 A1 | 1/2006 | Yoshimura et al. | |
| 2007/0188018 A1 * | 8/2007 | Reuter | B60T 8/4081 |
| | | | 303/114.1 |
| 2008/0010595 A1 * | 1/2008 | Chen | G06F 11/2025 |
| | | | 715/718 |
| 2008/0086916 A1 | 4/2008 | Ellis | |
| 2008/0312790 A1 * | 12/2008 | Fey | B60R 21/0132 |
| | | | 701/38 |
| 2009/0069964 A1 | 3/2009 | Wyatt et al. | |
| 2009/0200661 A1 | 8/2009 | Ellis | |
| 2009/0236859 A1 * | 9/2009 | McFadden | F02N 11/04 |
| | | | 290/38 R |
| 2010/0117585 A1 * | 5/2010 | Fitch | B25J 13/06 |
| | | | 361/114 |
| 2010/0143156 A1 | 6/2010 | Kong | |
| 2010/0292881 A1 * | 11/2010 | Takahashi | B60W 20/50 |
| | | | 701/22 |
| 2011/0125356 A1 * | 5/2011 | Takahashi | B60K 6/48 |
| | | | 903/902 |
| 2011/0241862 A1 | 10/2011 | Debouk et al. | |
| 2012/0101671 A1 | 4/2012 | Caouette | |
| 2012/0311690 A1 | 12/2012 | Ellis | |
| 2013/0179006 A1 | 7/2013 | Nordbuch et al. | |
| 2013/0253793 A1 * | 9/2013 | Lee | B60W 50/029 |
| | | | 701/70 |
| 2014/0163796 A1 * | 6/2014 | Omi | B60W 20/20 |
| | | | 180/65.23 |
| 2014/0163804 A1 | 6/2014 | Kaneko et al. | |
| 2015/0008726 A1 * | 1/2015 | Minami | B60T 11/103 |
| | | | 303/14 |
| 2015/0134205 A1 * | 5/2015 | Shibuya | B62D 6/04 |
| | | | 701/41 |

* cited by examiner

The Toyota Prius Transmission

The Chevy Volt Transmission

TOYOTA PRIUS

Schematics of electric four-wheel-drive hybrid system

Hybrid powertrain with separate driving axles

Four Wheel Drive Hybrid powertrain with separate driving axles

FAILSAFE DEVICES, INCLUDING TRANSPORTATION VEHICLES

RELATED APPLICATION DATA

This application is a continuation of U.S. patent application Ser. No. 16/386,380, filed on Apr. 17, 2019, which, in turn, is a continuation of U.S. patent application Ser. No. 14/185,686, filed on Apr. 20, 2014, now U.S. Pat. No. 0,300,779, issued on May 28, 2019, which, in turn, claims priority to U.S. Provisional Patent Application Ser. No. 61/852,039, filed Mar. 15, 2013, entitled, "Failsafe Devices, Including Transportation Vehicles"; to U.S. Provisional Patent Application Ser. No. 61/851,206, filed Mar. 4, 2013, entitled, "Failsafe Devices, Including Transportation Vehicles"; to U.S. Provisional Patent Application Ser. No. 61,851,084, filed Mar. 1, 2013, entitled, "Failsafe Devices, Including Transportation Vehicles"; to U.S. Provisional Patent Application No. 61/850,947, filed Feb. 27, 2013, entitled, "Failsafe Devices, Including Transportation Vehicles"; to U.S. Provisional Patent Application Ser. No. 61/850,825, filed Feb. 25, 2013, entitled, "Failsafe Devices, Including Transportation Vehicles"; and to U.S. Provisional Patent Application Ser. No. 61/850,746, filed Feb. 22, 2013, entitled, "Non-Fragile Devices, Including Transportation Vehicles". All of the foregoing applications are hereby incorporated by reference in their entirety.

BACKGROUND

Most modern devices, and particularly including transportation vehicles like automobiles as a prime example, have become both much more powerful, efficient, and safe, but at a cost of also being much more complex and correspondingly much less reliable. Indeed, modern devices have become inherently fragile. The most common element in this substantial dual increase of advantages and disadvantages of modern devices such as cars is the ever increasing use of digital computers and microprocessors to control essential functions that were originally mechanical systems integrated with electrical, hydraulic, and chemical systems. More specifically, these digital microprocessors have been integrated into a central computer control system for the entire car that controls most or all of the essential functions of the car. Therefore, the entire modern device has become only as reliable and safe as the extraordinarily complex hardware and software computer system that controls it. Furthermore, and critically, mechanical systems tend generally to degrade in a localized manner and slowly over time in a gradual progression which often becomes increasingly apparent, whereas computer control systems tend to fail suddenly and completely and without warning, resulting in catastrophic failure of the device.

Unfortunately, modern digital computer systems are vulnerable to many new types of failures to which previous device combinations of mechanical, hydraulic, and electrical systems were not subject. For example, as computer control systems have become increasingly connected to external networks like the Internet they have become increasingly vulnerable to other risks like hacking that can lead to partial or complete device failure. Even a partial software failure can be to a critical function like a car's throttle control, causing uncontrollable acceleration resulting in catastrophic accidents in the real world with significant loss of life. Complete system failure is possible and perhaps imminent due to the extreme vulnerability of modern computer systems to major solar flares (a once every 150 years event last occurring in the Nineteenth Century and now overdue) or to another massive electromagnetic pulse (EMP) artificially generated by a high altitude nuclear explosion affecting the entire East coast of the U.S., or to a "digital Pearl Harbor", for example. In either case, all modern devices of every sort that are controlled by microcomputer systems would completely cease to function until the microcomputer systems were replaced, which would likely be a very long time, resulting quickly in geographically widespread conditions far worse than those of a third world country.

Even if the future avoids such major catastrophic events (or more minor versions), digital computer-based automotive technology is already rapidly advancing in the direction of nearly complete computer control of all of the critical operations of driver-free cars, which are already at the stage of advanced operational prototyping and testing, including a blind driver being driven point to point by a Google test car through regular street traffic without any driver.

It is therefore both possible and necessary to make computers systems inherently far more robust through the use of both internal hardware access barriers or firewalls within computers or microchips and Faraday Cages surrounding those computers and microchips, as the applicant as previously shown in U.S. patent application Ser. No. 398403 filed Feb. 16, 2012 and published as Publication No. 20120311690 on Dec. 6, 2012, as well as PCT Application No. PCT/US2012/025481, published as International Publication Number WO 2012/112794 A1 on 23 Aug. 2012. Both of these applications are incorporated by reference herein in their entirety. Particularly useful are the embodiment examples shown in FIG. 6, FIG. 11, and FIG. 14.

However, whether or not the non-fragile computer systems described in these applications are used in many or most future devices like automobiles to reduce or eliminate these specific threats, a more basic problem still exists in the design of modern devices. With such devices, failure of all or part of the central computer control system can lead to failure of all or part of the controlled mechanical, hydraulic, or electrical systems that would otherwise be capable of functioning in a manner similar to older, pre-digital devices, if not designed to be totally reliant on the central computer control system, as is generally the case now.

As a result, many or most modern devices are designed to work either exceptionally well or not at all. But all or nothing at all is too fragile. All engineering designs are the product of many trade-offs, but the existing modern approach had generally sacrificed reasonable reliability against catastrophic failures for a vast multitude of enhanced features, including important ones like increased power or efficiency, but far too many enhanced features that are trivial and mainly add to complexity.

SUMMARY

It would be therefore more prudent both for individual customer users of modern devices, as well as for adequate protection of critically important U.S. national transportation infrastructure, for future devices to be as completely safe from failure as possible. Such future devices can be made as completely failsafe as possible by incorporating the following simple new invention, again taking the example of an automobile: all critical systems of the automobile designed so that, in the event of computer control system malfunction (partial or total) affecting any or all of such critical systems, those systems automatically by default (or manually switch by an operator) to non-digital systems of a mechanical, hydraulic, electrical, chemical, or other nature of more a traditional design proven in years of use in the past or a new design specifically planned to work both with or without digital computer control. This is, in the event of any digital control malfunction of any critical component, an automobile would still be drivable with at least basic conventional capabilities, either automatically by default or by manually activated switch by the driver. More broadly stated, any modern device would still be usable in the same way, so that the advantages of digital computer control are maintained at the same time that failsafe reliability is gained for at least the basic functions of a device.

This is best understood taking the example of the existing automotive systems that are similar to the invention described briefly above, namely, many existing anti-lock braking systems. Under normal conditions, the driver has direct manual control of the brakes, a critical manual/hydraulic system which also has a power-assist assistance; under low traction conditions, the anti-lock system is activated by a sensor and computer system. In this example, if the anti-lock system fails, the other components continue to function to brake the automobile; and if the power-assist function fails, the manual braking system still functions, albeit less effectively. This example of course ignores the potential for any current or future integration of the braking system into the automobile's central computer control system, which would create the same vulnerability to failure discussed above.

The automobile's steering system illustrates the unfortunate problem of the current transition of all the automobile's critical systems to digital computer control. Whereas in the past, drivers have had a direct mechanical control of a car's steering, with power-assist being the only major additional component, in the many new steering systems there is no direct linkage, so that if any of the electronic portions of the steering system fail or the central computer controls system fails, the driver loses steering control, with potentially catastrophic results. In this case, breaking the direct linkage connection of the driver to the steering appears to be a good example of bad engineering trade-offs wherein some efficiency and significantly enhanced capability to custom steering setting to the driver's preferences or to road conditions are gained at the expense of vulnerability to catastrophic steering accidents and potential loss of life.

To implement the invention, one or more or all of the critical systems of a device can be designed so that (1) it can be controlled locally and/or centrally and/or remotely (such as through a "cloud"-based system) by a computer system (digital and/or analog) for optimal effectiveness and (2) it can still operate to at least meet the most minimal system requirements for the device to function essentially as intended, however less effectively. Put simply in the example, the critical systems of a car can be designed to function best with computer control, but the car can be still drivable even with complete computer system failure. The automobile's critical systems include those for stopping, steering, starting, propulsion, drive train, suspension, safety, and wheels/tires. It is clearly advantageous for all such systems to be designed such that any computer system control is an add-on capability, the absence of which does not cause the controlled critical system to fail. The invention when applied to each of the example automobile critical systems is obviously enabled within the existing state of the automotive art, since all of the automobile's above cited critical systems were well known many years before the dawn of the digital age. The same is true of other, non-automotive devices. The applicant's failsafe device invention calls for modern digital systems and proven pre-digital systems to be both included in the device, not just the former now or the latter in the past, and that it is highly advantageous for all of the basic operations of any device to include both systems. Doing so in the applicant's failsafe device inventions provides both superior performance and reliability, not just one or the other, as is the current and unnecessarily unsafe situation, and can do so for all the essential functional components of the entire device, not just some part or parts of it.

In a first alternative embodiment, the present invention relates to a failsafe device configured to perform an operation including at least a part or all of one or more of a mechanical system, a hydraulic system, an electrical system, and a chemical system, including; at least one electronic system controlled by at least one computer and/or microprocessor; at least one non-electronic system controlled by at least one computer and/or microprocessor; at least one non-electronic system, including at least one of said mechanical, hydraulic, electrical, or chemical systems; and the device being configured to operate in two modes; in a normal, maximal performance mode, said device is configured so that said operation is performed by said at least one non-electronic system when said at least one non-electronic system is controlled by said at least one electronic system; and in an emergency, minimal performance mode, when said at least one electronic system malfunctions at least partially, said device is configured so that said operation is still performed by said at least one non-electronic system, wherein the device is configured to be a part of or to be itself a vehicle.

In the foregoing embodiment, the operation may be a propulsion operation and said propulsion may be provided at least in part by said at least one internal combustion engine that is configured to power one or more drive wheels to which said engine is connected by a transmission that includes at least one clutch; and wherein said operation also includes a start operation when in an emergency, minimal performance mode; said at least one clutch is configured to operate at least by manual control of a driver.

In another aspect of the first alternative embodiment, the failsafe device may be configured to be capable of being jump started and/or to include a crank configured for manual operation by hand or external power to turn over said engine in order to start said engine.

In another aspect of the first alternative embodiment, the operation may be a steering operation and said steering is provided at least in part by a continuous mechanical connection being configured to extend at least between a driver's steering wheel and the steering wheels of the vehicle.

In another aspect of the first alternative embodiment, the operation may be a braking operation and said braking is provided at least in part by a continuous mechanical/hydraulic connection being configured to extend at least between a driver's brake pedal and the brakes of the vehicle.

In another aspect of the first alternative embodiment, the device may be may be configured to perform an operation including at least a part or all of two, or three, or more of a mechanical system, a hydraulic system, an electrical system, and a chemical system.

In another aspect of the first alternative embodiment, the device may be configured to perform an operation including at least a part or all of a mechanical system, a hydraulic system, an electrical system, and a chemical system.

In another aspect of the first alternative embodiment, the device may be configured to perform an operation including at least a part or all of a mechanical system.

In another aspect of the first alternative embodiment, the device may be configured to perform an operation including at least a part or all of a hydraulic system.

In another aspect of the first alternative embodiment, the device may be configured to perform an operation including at least a part or all of an electrical system.

In another aspect of the first alternative embodiment, the device may be configured to perform an operation including at least a part or all of a chemical system.

In another aspect of the first alternative embodiment, the failsafe device may be configured to include one or more entertainment, navigation or other electronic systems, whether built into said device or a separate device, with at least one computer and/or microprocessor that do not control at least a part of said at least one non-electronic system; the one or more entertainment, navigation or other electronic systems are not connected to said one or more electronic systems with at least one computer and/or microprocessor that control said at least one non-electronic system.

In another aspect of the first alternative embodiment, at least a part or all of said at least one electronic system may be controlled by at least one computer and/or microprocessor that is remotely located outside of said failsafe device.

In another aspect of the first alternative embodiment, at least a part or all of said at least one electronic system may be controlled by at least one computer and/or microprocessor that is remotely located in at least one cloud-based computer system or other remote array of computer servers.

In another aspect of the first alternative embodiment, at least a part or all of one or two or three or four of said systems may be controlled through said at least one electronic system by at least one computer and/or microprocessor that is remotely located in at least one cloud-based computer system or other remote array of computer servers.

In another aspect of the first alternative embodiment, at least a part or all of one or two or three or more of said operations may be controlled through said at least one electronic system by at least one computer and/or microprocessor that is remotely located in at least one cloud-based computer system or other remote array of computer servers.

In another aspect of the first alternative embodiment, the device may be configured such that, when the device is being operated or started, an audible, visual, or other alarm and/or display will be triggered if a part or all of said electronic system malfunctions in part or fails completely, said alarm and/or display being provided to the operator of the device.

DETAILED DESCRIPTION OF EXAMPLE EMBODIMENTS

Figure 1:
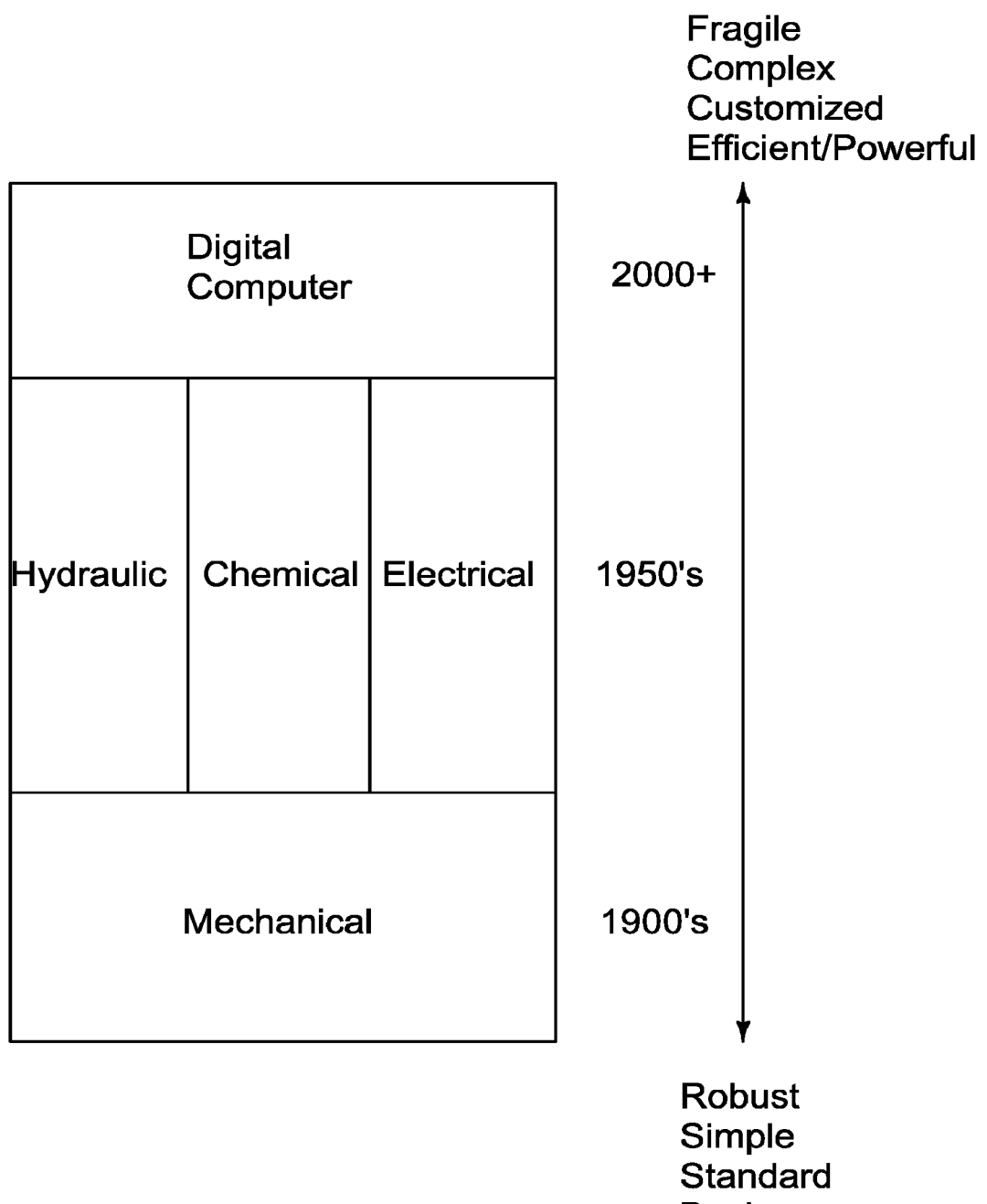
FIG. 1 shows an historical progression of technology, from simple to complex systems.

FIG. 1 is a diagram showing mechanical, hydraulic, electrical, and chemical systems that are controlled by an electronic digital computer, showing a rough correlation from simple, standard and basic to complex, customized and elaborate during the period from the 1900's through the 1950's into the 2000+; more generally, from robust then to fragile now, with most systems controlled by microprocessor-based computer systems.

Figure 2A:
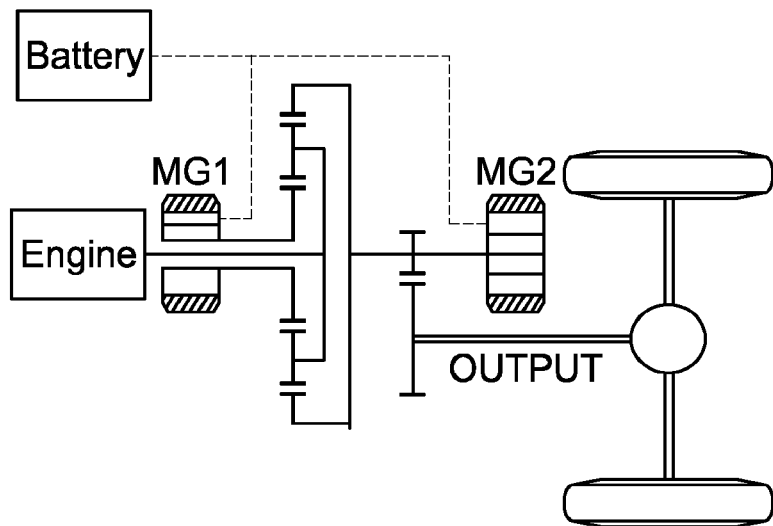
FIGS. 2A and 2B show prior art functional schematics of the architecture of the transmissions and associated components of two hybrid automobiles, a Toyota Prius and Chevy Volt, respectively
Figure 2B:
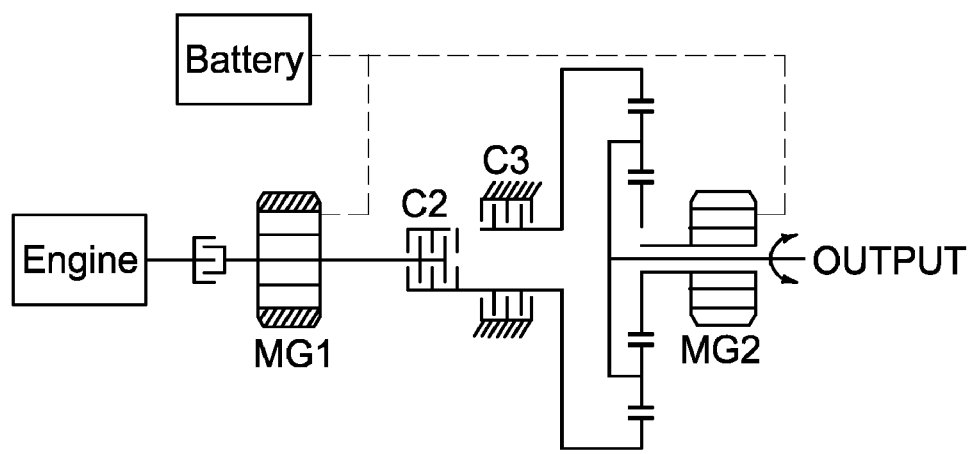

FIGS. 2A and 2B show prior art functional schematics of the architecture of the transmissions and associated components of two hybrid automobiles, a Toyota Prius and Chevy Volt, respectively.

Figure 3A:
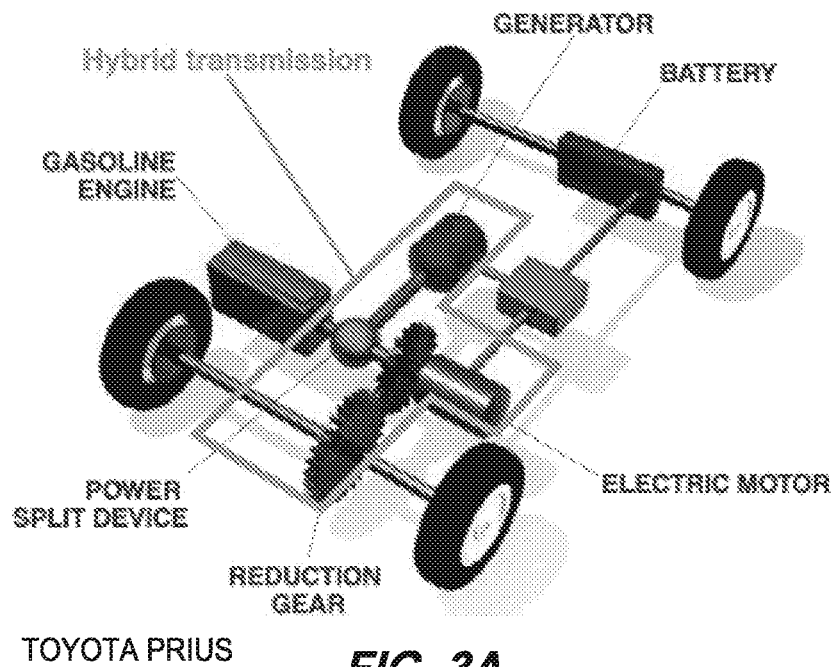
FIGS. 3A, 3B and 3C show prior art functional schematics and provide a narrative of the architecture of the hybrid transmission and associated components of the prior art Toyota Prius.
Figure 3B:
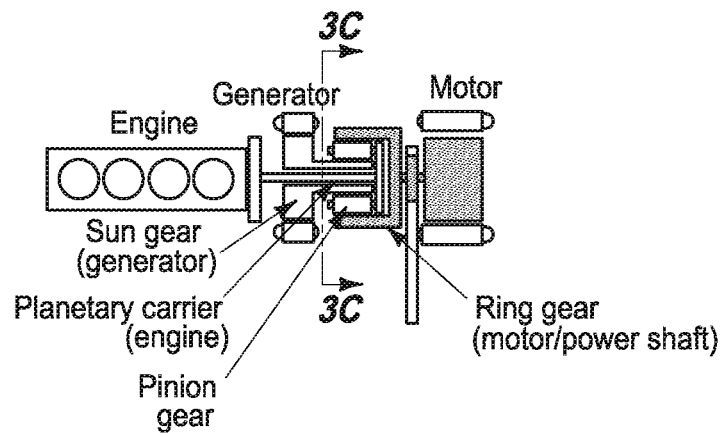
Figure 3C:
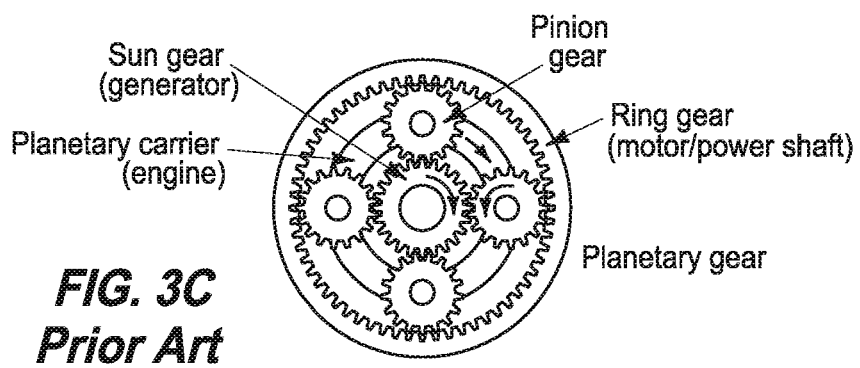

FIGS. 3A, 3B and 3c show prior art functional schematics and provide a narrative of the architecture of the hybrid transmission and associated components of the prior art Toyota Prius.

Figure 4:
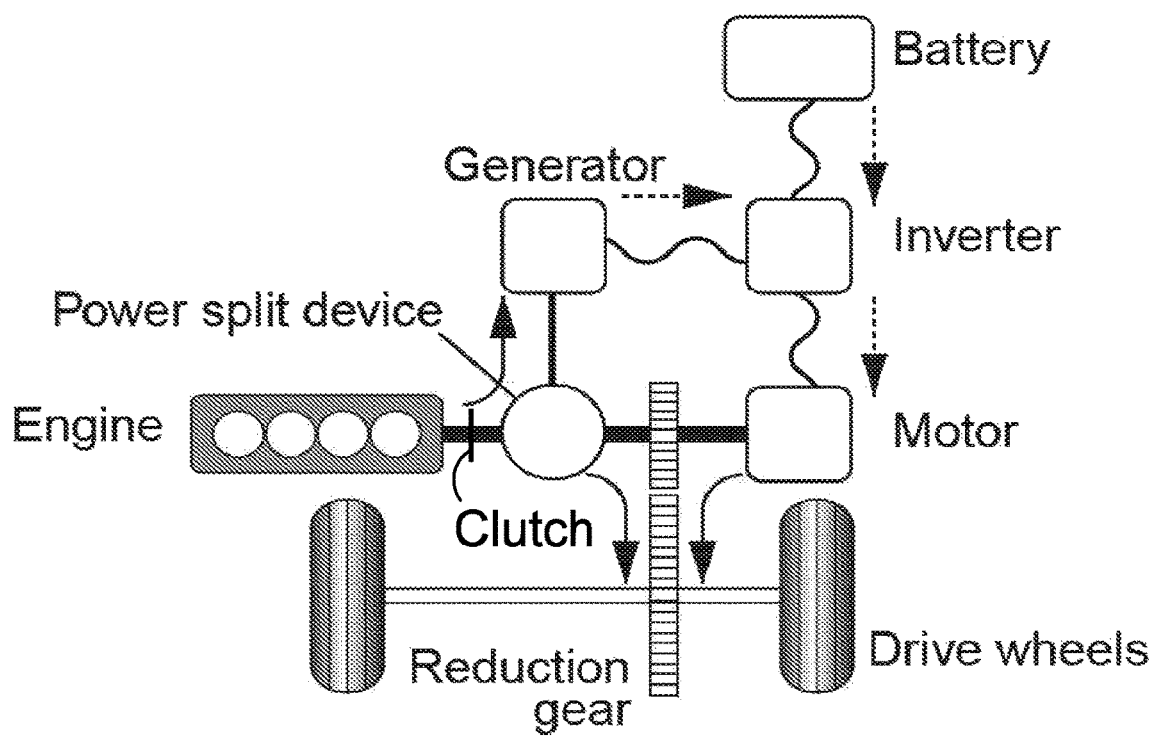
FIG. 4 shows an example series/parallel hybrid system with a new architecture based on the Toyota Prius prior art model but also including a new, additional clutch not present in the Prius.

FIG. 4 shows an example series/parallel hybrid system based on the Toyota Prius model. FIG. 4 also shows a new, additional clutch (mechanical or other) not present in the Prius; the new clutch is located on the drivetrain between the engine (such as an internal combustion engine or ICE, especially a simple diesel without electronic components) and the drive wheels; the clutch can be located between the engine and the power split device (such as a planetary gear system), incorporated with the power split device, or between the power split device and reduction gear; the clutch can also be incorporated with its own reduction gears, for example. In this example, if the electronic computer control system fails, the driver can use a manually activated control to disengage or engage the engine from the drive wheels so as to provide an emergency capability to "jump start" the automobile, functioning therefore like that of conventional manual transmission and clutch) at low vehicle speeds like 5, 10, 15, 20 or 25 mph, for example. This hybrid system (manual or non-electronically controlled) clutch can be activated by a conventionally located pedal or other location such as on the dashboard, center console, etc. using a switch mechanism, for example. Thus, the failsafe device can be configured to be capable of being jump started. The failsafe device can also be configured to include a crank configured for manual operation by hand or external power to turn over said engine in order to start said engine.

FIG. 4 indicates that, with such a clutch can as an option be decoupled from the drive wheel when for example the motor is not functioning due to computer and/or sensor and/or other electronic component malfunction. Such decoupling can be by manual control by the driver of a mechanical clutch, for example, or alternately by a default setting conditioned on the motor's electronic or other malfunction; the motor can default automatically to a no-load free wheeling setting when the computer and/or sensor and/or other electronic failure disables the motor function.

Any of the components of the configuration of the example failsafe device described or shown in FIG. 4 can be combined with any other components of the example embodiments of the failsafe device inventions described in previous FIGS. 1-3 above.

Figure 5:
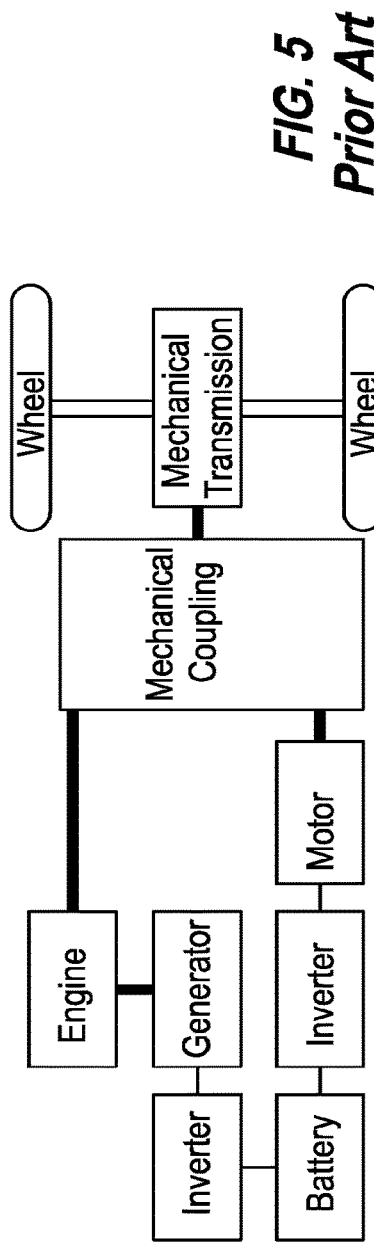
FIG. 5 shows a prior art example of the basic architecture of a series/parallel hybrid electrical vehicle (HEV).

FIG. 5 shows a prior art example of the basic architecture of a series/parallel hybrid electrical vehicle (HEV).

Figure 6:
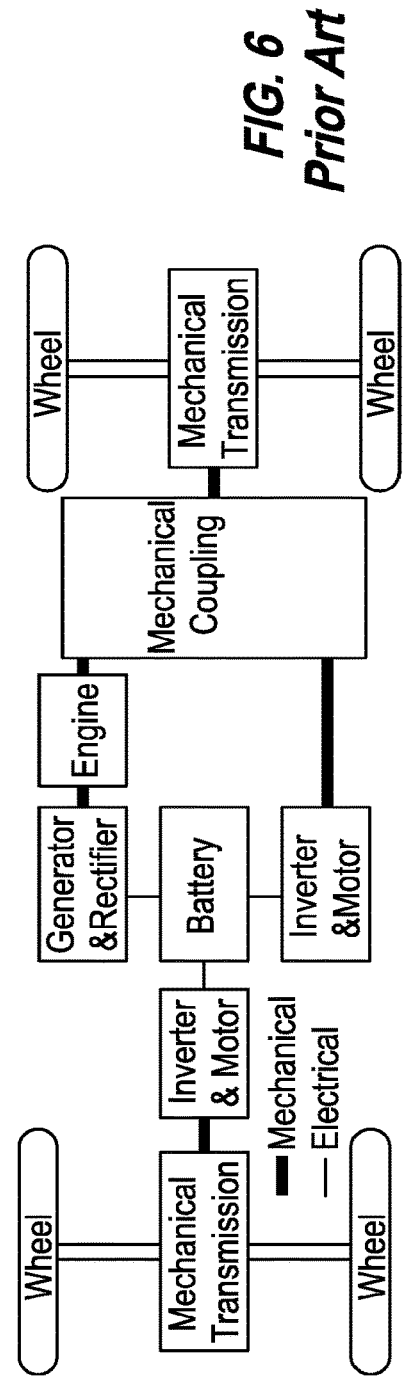
FIG. 6 shows a prior art example of a four-wheel drive system using a complex architecture.

FIG. 6 shows a prior art example of a four-wheel drive system using a complex architecture.

Figure 7:
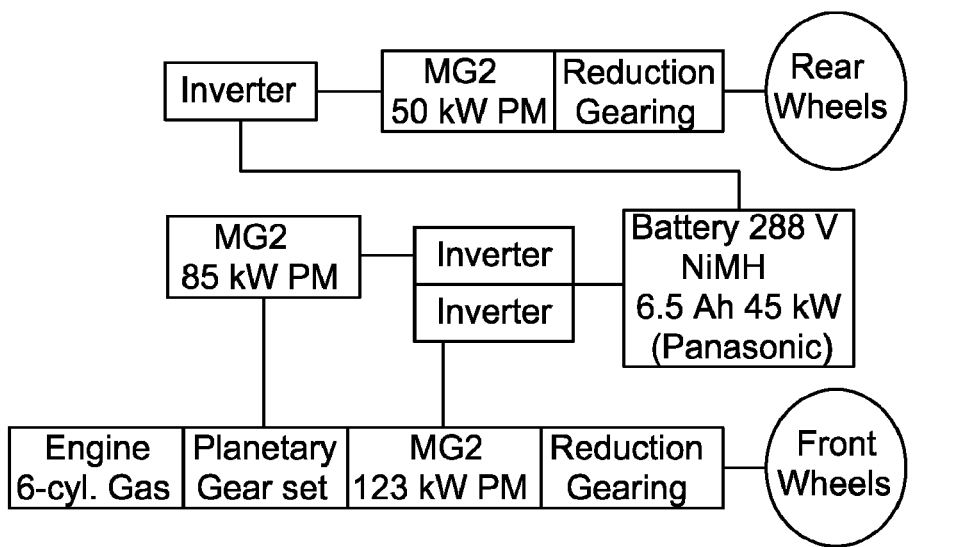
FIG. 7 shows prior art functional schematics of the architecture of the transmissions and associated components of the electric four wheel-drive hybrid system of the Toyota Highlander and Lexus Hybrid.

FIG. 7 shows prior art functional schematics of the architecture of the transmissions and associated components of the electric four wheel-drive hybrid system of the Toyota Highlander and Lexus Hybrid.

Figure 8:
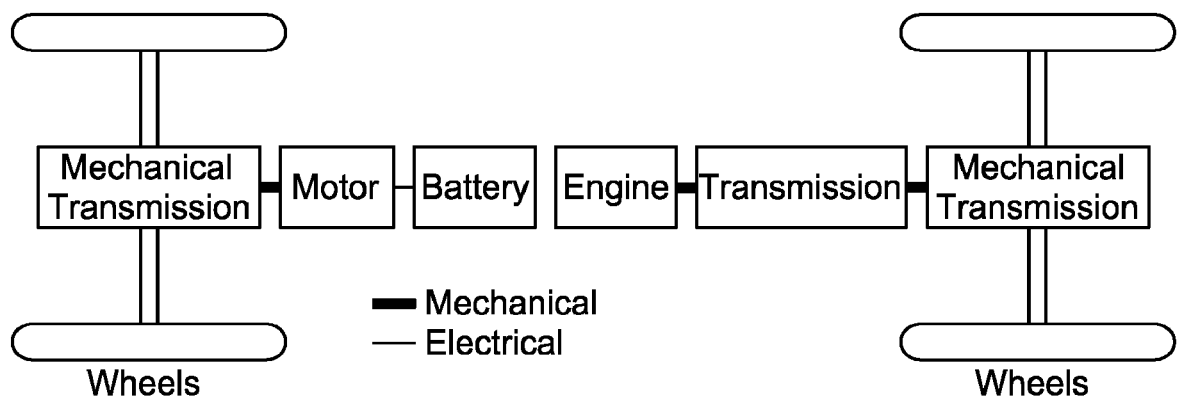
FIG. 8 shows prior art functional schematics of the architecture of the transmissions and associated components of a hybrid powertrain with separate driving axles.

FIG. 8 shows prior art functional schematics of the architecture of the transmissions and associated components of a hybrid powertrain with separate driving axles.

Figure 9:
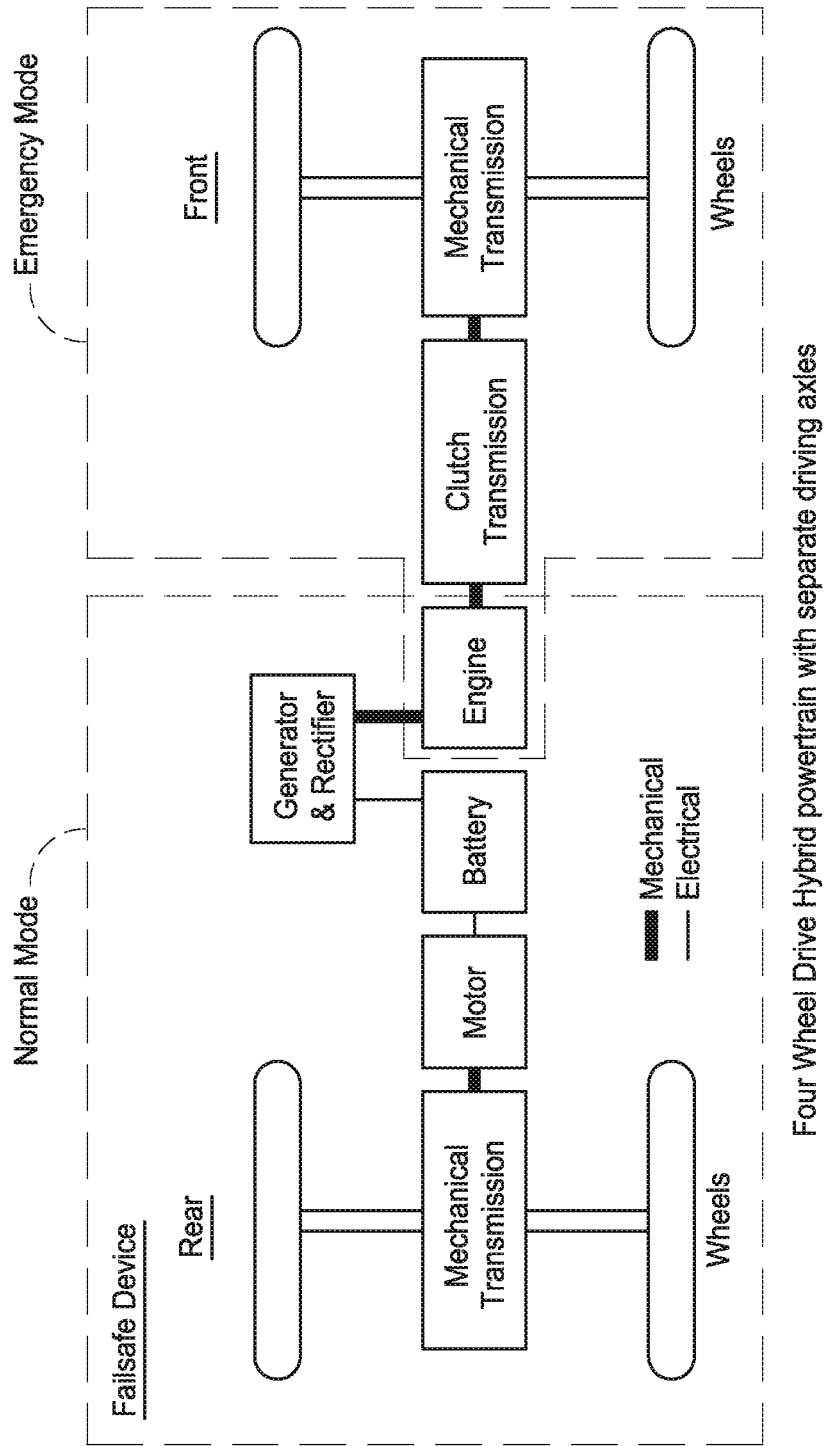
FIG. 9 is based on existing architecture of FIG. 8, but shows the applicant's new design for a hybrid four-wheel drive powertrain and other new features.

FIG. 9 is based on existing architecture of FIG. 8, but shows the applicant's new design for a hybrid four-wheel drive powertrain and other new features. FIG. 9 is a series/parallel hybrid powertrain for a four wheel drive vehicle like a sports utility vehicle, truck, sedan, or other transportation or other vehicle. The example embodiment shown includes a generator and rectifier located between the engine connected through a transmission to, for example, the front wheels and a battery powering an electrical motor connected to the rear wheels.

The engine's transmission includes a clutch that is configured to be capable of manual control by a driver for use in "jump starting" the engine in an emergency in which a failure in the computer/microprocessor control system or other electronic component or components prevent the engine from being started in a normal manner. "Jump starting" is understood here to mean typically the emergency procedure by which an engine is started by disengaging a manual transmission clutch, shifting into first gear, getting the automobile up to moderate speed by being pushed or coasting downhill, briskly engaging the clutch so that the engine is turned over by the action of the wheels, allowing the automobile to start when a battery or start malfunction or fail. The use of a relatively small and simple diesel engine without control by computers and or microprocessors or other electronic components like sensors (or a configuration allowing for operation with or without computer/microprocessor control and/or other electronic components) would provide a failsafe engine start (and continued operation).

The example embodiment shown in FIG. 9 allows for use like a Plug-In electrical vehicle (EV) operating only on the electrical motor in normal driving conditions within the normal driving range allowed by the vehicle's battery, from a few miles to 25 or 50 or 100, currently. Optionally, addition power to accelerate can be provided by the engine mechanically driving the front wheels. For extended range operation, power can be provided by the engine, such as a gasoline or diesel internal combustion engine, to the generator and rectifier to charge the battery to power the electrical motor driving the rear wheels, in a series hybrid configuration.

In the event of a malfunction or failure of the vehicle's computer and/or microprocessor control system, the example embodiment shown in FIG. 9 is configured to operate in an emergency mode whereby the engine can drive the front wheels mechanically.

Any of the components of the configuration of the example failsafe device described or shown in FIG. 9 can be combined with any other components of the example embodiments of the failsafe device inventions described in previous FIGS. 1-8 above.

Figure 10:
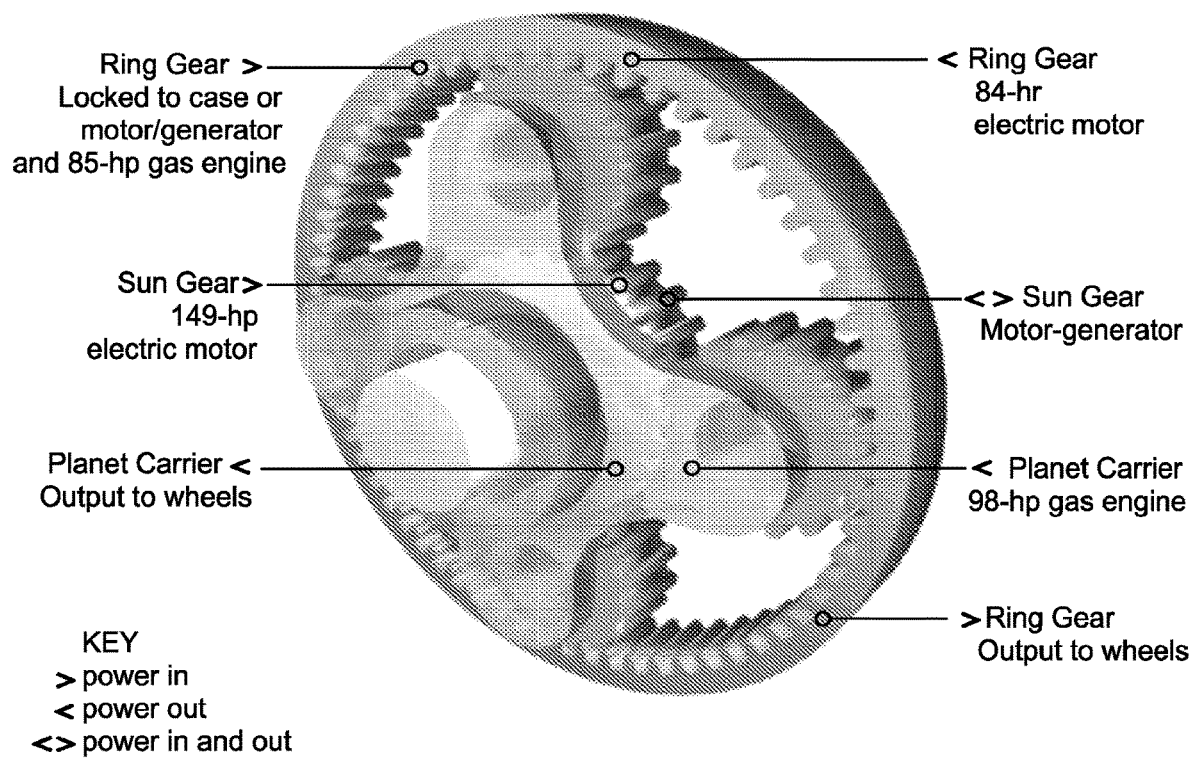
FIG. 10 is a prior art perspective view of a comparative view of the planetary gear of the hybrid transmission systems of the Chevy Volt and the Toyota Prius.

FIG. 10 is a prior art comparison of the planetary gear system of the Toyota Prius and the GM Volt. The failsafe device described within this application can be particularly effectively incorporated as an invention in hybrid vehicles, most especially in series/parallel hybrid systems, and even more especially in hybrid systems like that used in the GM Volt, which operates primarily as a series hybrid system when driven in its normal distance range, which would be in electrical only mode generally. As battery technology improves over time, the normal driving range of dominantly series hybrid cars will be significantly extended and on a cost effective basis. As a result, such a hybrid car over the next decade will function almost exclusively as a plug-in electric, but with emergency mechanical motive power available from what needs only to be a relatively small and simple nonelectronic diesel engine that, because of its only very occasional, does not need the additional fuel efficiency and/or power provided by computer controlled electronic systems.

FIG. 10 is a prior art perspective view of a comparative view of the planetary gear of the hybrid transmission systems of the Chevy Volt and the Toyota Prius.

Figure 11:
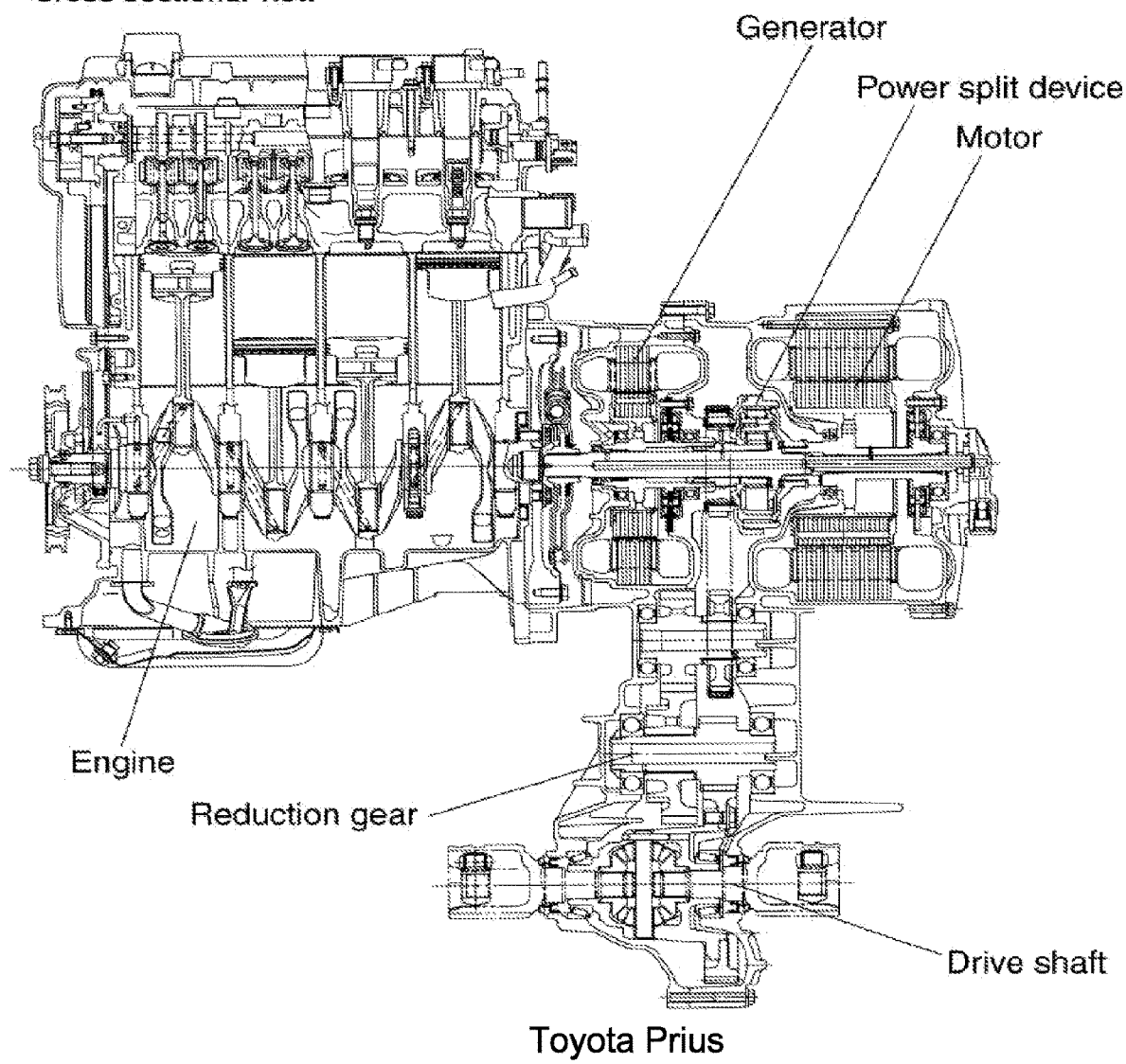
FIG. 11 is a prior art cross-sectional view of the powertrain of the Toyota Prius.

FIG. 11 is a prior art cross-sectional view of the powertrain of the Toyota Prius.

Figure 12:
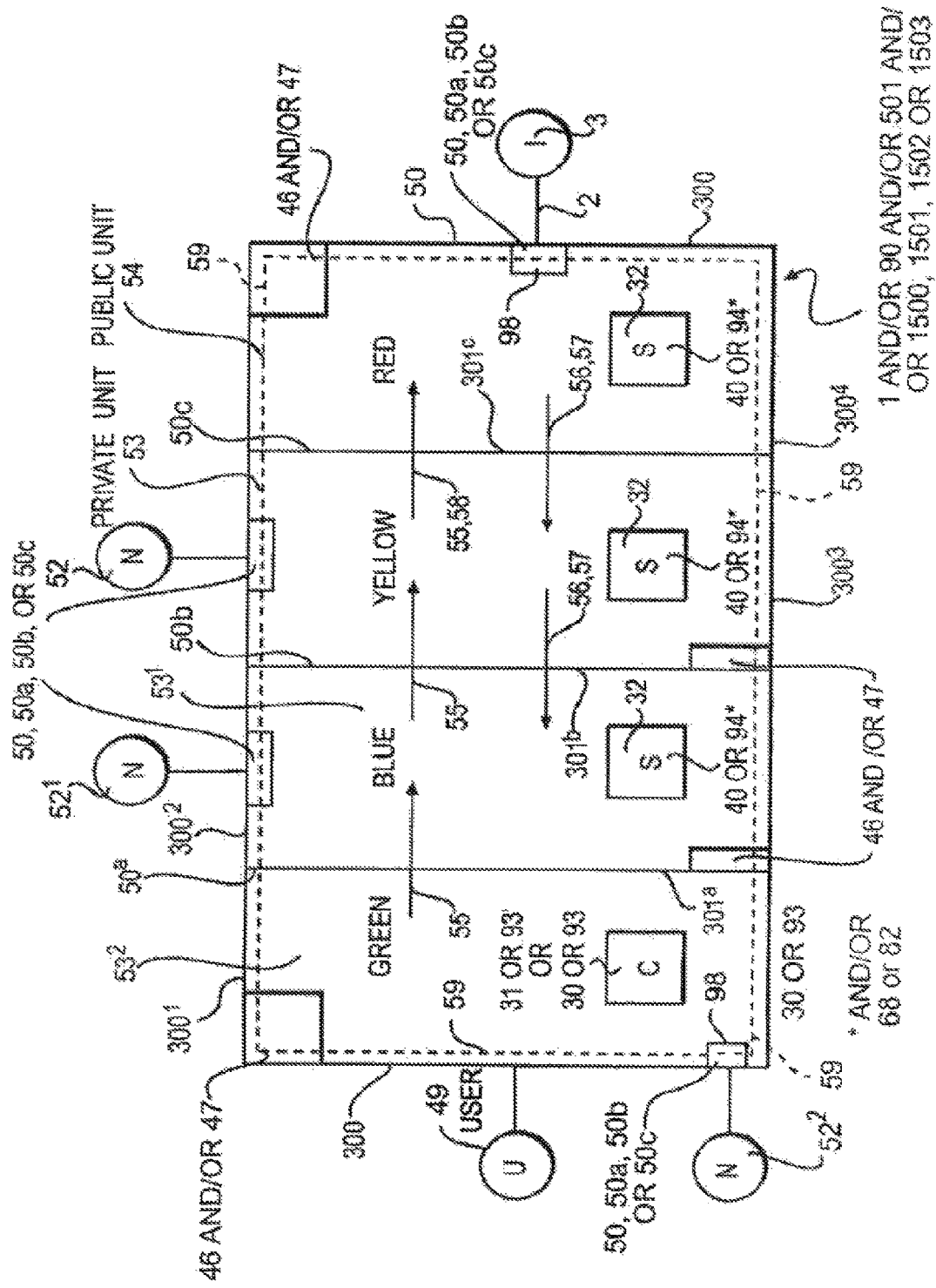
FIGS. 12, 13 and 14 are prior art examples of the applicant's prior inventions relative to multiple internal access barriers or firewalls and Faraday Cages for computers and/or microprocessors; the figures are FIGS. 6, 11 and 14 of the applicant's PCT Application No. PCT/US2012/025481, published as International Publication Number WO 2012/112794 A1 on 23 Aug. 2012 and his U.S. patent application Ser. No. 398403 filed Feb. 16, 2012 and published as Publication No. 20120311690 on Dec. 6, 2012.
Figure 13:
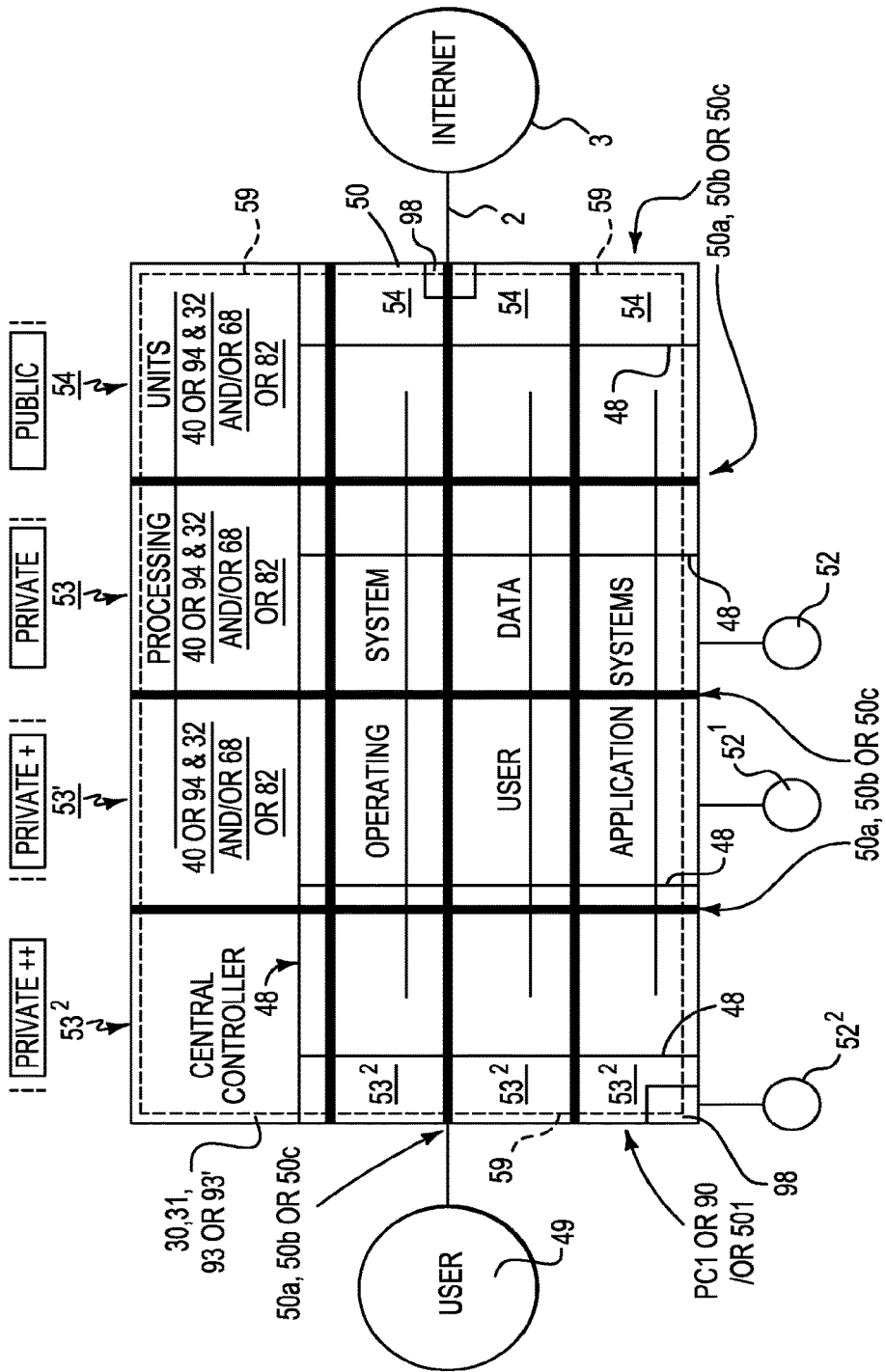
Figure 14:
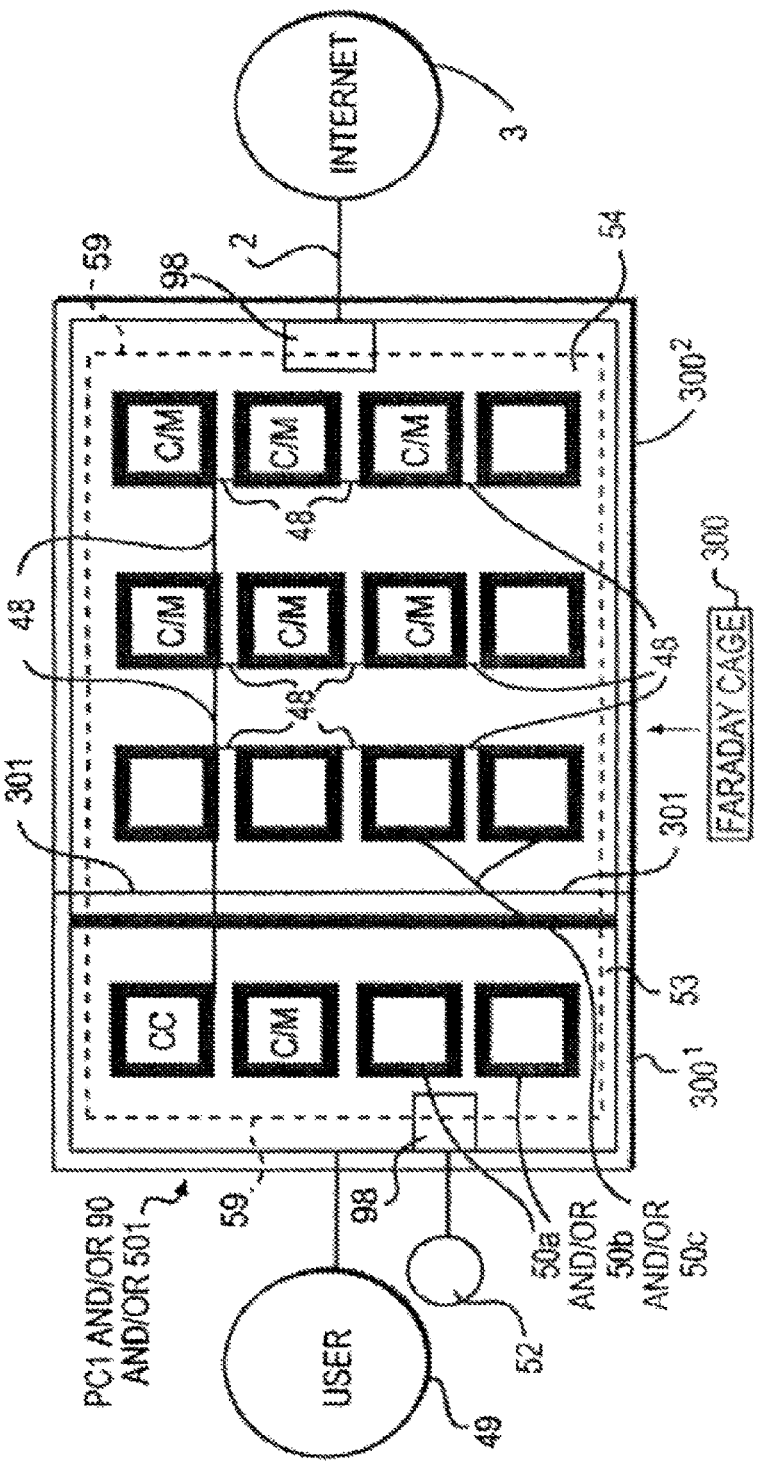

FIGS. 12, 13 and 14 are prior art examples of the applicant's prior inventions relative to multiple internal access barriers or firewalls and Faraday Cages for computers and/or microprocessors; the figures are FIGS. 6, 11 and 14 of the applicant's PCT Application No. PCT/US2012/025481, published as International Publication Number WO 2012/112794 A1 on 23 Aug. 2012 and his U.S. patent application Ser. No. 398403 filed Feb. 16, 2012 and published as Publication No. 20120311690 on Dec. 6, 2012; both applications have been incorporated by reference in their entirely herein. The features shown in the example embodiments described in the '481 and '403 applications can be combined with the failsafe device inventions described above in this application, including specifically FIGS. 1-11.

Figure 15A:
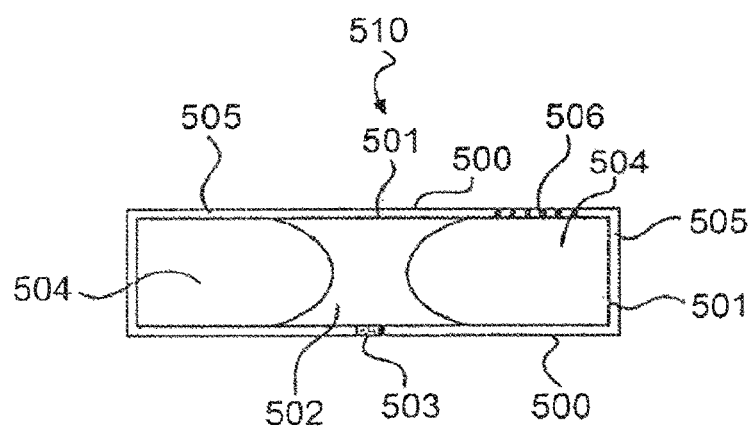
FIGS. 15A, 15B and 16 are prior art examples of the applicant's prior inventions relative to internal sipes and bladders, chambers, and compartments, including with computer/microprocessor control; the figures are FIGS. 1 A, 2B, and 15 of the applicant's U.S. application Ser. No. 11/802,930 filed May 25, 2007 and published as Pub. No. US 2008/0086916 on Apr. 17, 2008.
Figure 15B:
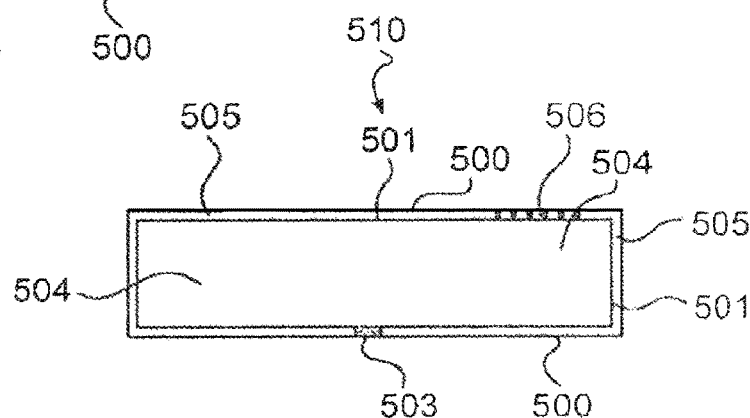
Figure 16:
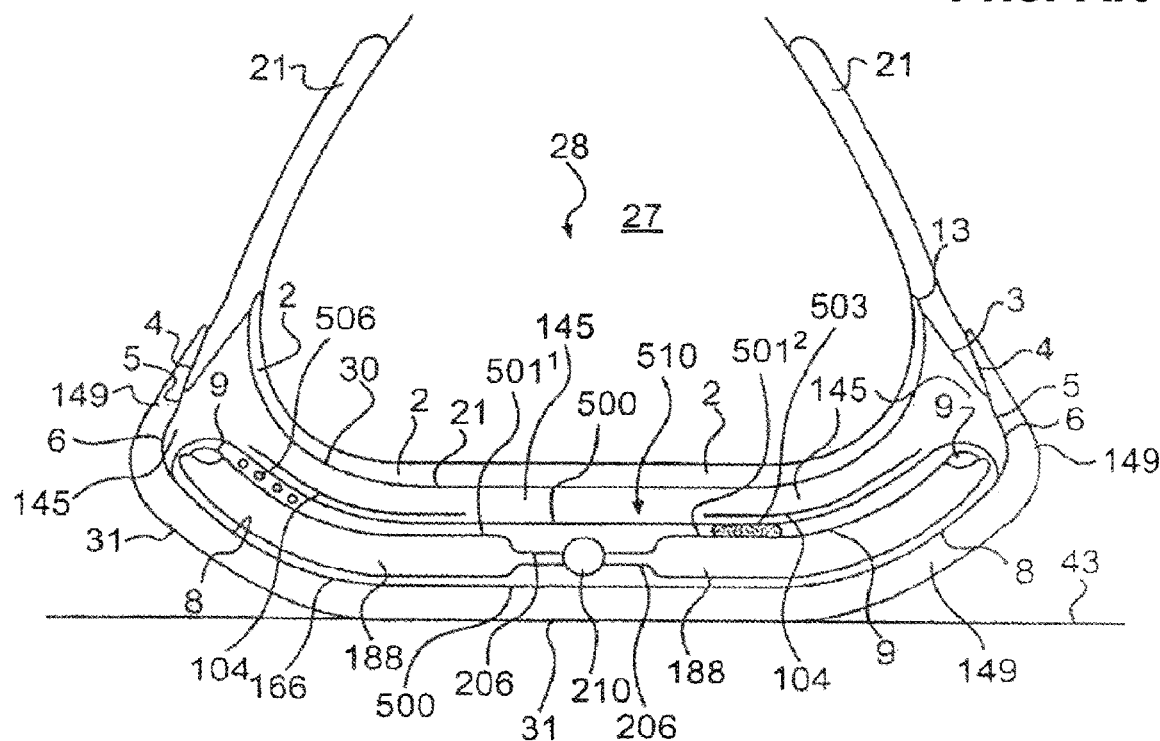

FIGS. 15A, 15B and 16 are prior art examples of the applicant's prior inventions relative to internal sipes and bladder, chambers, and compartments, including with computer/microprocessor control; the figures are FIGS. 1 A, 28, and 15 of the applicant's U.S. application Ser. No. 11/802, 930 filed May 25, 2007 and published as Pub. No. US 2008/0086916 on Apr. 17, 2008; the application has been incorporated by reference in their entirely herein. The features shown in the example embodiments described in the '930 application can be combined with the failsafe device inventions described above in this application, including specifically FIGS. 1-16.

Also incorporated by reference herein in their entirety are the applicant's U.S. application Ser. No. 11/802,930 filed May 25, 2007 and published as Pub. No. US 2008/0086916 on Apr. 17, 2008, and Ser. No. 12/292,769 filed Nov. 25, 2008 and published as Pub. No. US 2009/0200661 A1 on Aug. 13, 2009. Any component described in this application can be combined with any other component in this application or in the applications incorporated by reference in this application, including specifically FIGS. 1-16.

The failsafe device can be configured, for example, to perform an operation including at least a part or all of one or more of a mechanical system, a hydraulic system, an electrical system, and a chemical system. The failsafe device can comprise for example the following configuration: at least one electronic system controlled by at least one computer and/or microprocessor; and at least one non-electronic system, including at least one of the mechanical, hydraulic, electrical, or chemical systems. The failsafe device can be configured to operate in two modes: in a normal, maximal performance mode the failsafe device can be configured so that the operation is performed by the at least one non-electronic system when the at least one non-electronic system is controlled by the at least one electronic system; and in an emergency, minimal performance mode, when the at least one electronic system malfunctions at least partially, the failsafe device can be configured so that the operation is still performed by the at least one non-electronic system, for example; also, in an emergency, minimal performance mode, when the at least one electronic system fails completely, the failsafe device can be configured so that said operation is performed by said at least one non-electronic system alone. Any of the components of the configuration of the example failsafe device described in this paragraph can be combined with any other components of the example embodiments of the failsafe device inventions described in previous paragraphs above.

The above failsafe device can be configured to be for example a part of or be itself a vehicle, including a hybrid electric vehicle (HEV) or an electric vehicle (EV). The failsafe device can be configured to include a part of or be itself a transportation vehicle, a bicycle or bike, a motorcycle, a car or automobile, a sports utility vehicle, an off-road vehicle, a truck, a tank or other military vehicle, a weapon or weapons system, a bus, a farm vehicle, a construction or repair vehicle, a firefighting vehicle, a police or emergency vehicle, a train, a subway car, a boat with one or more hulls, a canoe, a ship, an airplane, a helicopter, a rocket, an elevator a hand or other tool, a power tool, powered equipment, sports or recreation equipment, entertainment equipment, educational equipment, a robot or robotic device, a prosthetic device, an implant device, a toy, a building or house, heating, cooling, or other equipment, a manufacturing process or equipment, an electrical power system, a wired or wireless telecommunications system, a sewage system, a water system, a radio or television system, a cloud computer system or other computer array, a factory, a delivery system, a laboratory, medical equipment, dental equipment, podiatric or orthotic equipment, a hospital or other medical treatment facility, a stadium, theater, or other entertainment facility, or footwear. Any of the examples of failsafe devices described in this paragraph can be combined with any other components of the example failsafe device inventions described in previous paragraphs above.

The failsafe device can perform for example the above operation performed by the failsafe device at a greater level of efficiency, speed, power, or effectiveness when said at least one non-electronic system is controlled by said at least one electronic system. This example embodiment of the failsafe device described in this paragraph can be combined with any other components of the example failsafe device inventions described in previous paragraphs above.

The failsafe device can be configured to include for example the electronic system and/or the at least one computer and/or the at least one microprocessor that is protected by a Faraday Cage, as described in the applicant's previous '403 U.S. Application and '481 PCT Application incorporated by reference above. As another example, the failsafe device can be configured to include the at least one computer and/or microprocessor with a part protected by one or more internal hardware access barriers or firewalls from access by an external network and/or the Internet, as described in the applicant's previous '403 U.S. Application and '481 PCT Application incorporated by reference above. The failsafe device can be configured to include for example the at least one computer and/or microprocessor with a master or central controller of the at least one computer and/or microprocessor, the master or central controller being protected by the one or more internal hardware access barriers or firewalls from access by an external network and/or the Internet, as described in the example embodiments, and combinations thereof, of applicant's previous '403 U.S. Application and '481 PCT Application incorporated by reference above. Any of the example embodiments of the failsafe device described in this paragraph can be combined with any other components of the example failsafe device inventions described in previous paragraphs above.

The above operation performed by the failsafe device can include for example one or more of a braking operation, a steering operation, a starting operation, a stopping operation, a gear shifting operation, an acceleration operation, a deceleration operation, a direction reversing operation, a propulsion operation, a drive train operation, a suspension operation, a wheel operation, a tire operation, a transmission operation, a battery operation, a power generation operation, a meter operation, an alternator operation, an electrical motor operation, an internal combustion engine operation, a fuel cell operation, a lighting operation, a steam engine operation, a furnace operation, a heating and/or cooling operation, a lifting or loading operation, a pulling or pushing operation, a digging or burying operation, a pumping operation, an emissions and/or pollution control operation, or a safety system operation. Any of the example operations of the failsafe device described in this paragraph can be combined with any other components of the example failsafe device inventions described in previous paragraphs above.

The failsafe device can be configured for example such that an operator of the failsafe device can have manual control of the operation using the at least one non-electronic system without control by the at least one electronic system when the at least one electronic system either malfunctions or fails. Alternately, the failsafe device can be configured to default automatically to perform the operation in the emergency minimal performance mode when the operation cannot be performed due to a malfunction or failure of said electronic system, as another example. Any of the example configurations of the failsafe device described in this paragraph can be combined with any other components of the example failsafe device inventions described in previous paragraphs above.

The failsafe device can include for example one or more internal sipes and/or one or more bladders, chambers, or compartments and/or computer control of said one or more bladders, chambers, or compartments, as described in any of the example embodiments, and combinations thereof, of the applicant's previous '930 application incorporated by reference above. Any of the elements of the failsafe device described in this paragraph can be combined with any other components of the example failsafe device inventions described in previous paragraphs above.

When the above operation is a propulsion operation, the propulsion can be provided, all or in part, by at least one battery and/or at least one fuel cell being configured to power at least one electrical motor that is connected to one or more drive wheels, for example. Any part of the configuration of the failsafe device described in this paragraph can be combined with any other components of the example failsafe device inventions described in previous paragraphs above.

In addition, when the operation is a propulsion operation, the propulsion can also provided, all or in part, by said at least one internal combustion engine being configured to be connected to at least one generator which charges at least one battery that powers at least one electrical motor connected to one or more drive wheels, as another example. Any part of the configuration of the failsafe device described in this paragraph can be combined with any other components of the example failsafe device inventions described in previous paragraphs above.

Also, when the operation is a propulsion operation, the propulsion can for example be provided, all or in part, said at least one internal combustion engine being configured to power one or more drive wheels to which said engine is connected. Any part of the configuration of the failsafe device described in this paragraph can be combined with any other components of the example failsafe device inventions described in previous paragraphs above.

The at least one internal combustion engine can be a gasoline engine or a diesel engine and can be configured to operate for example without control by one or more computers and/or microprocessors when in an emergency, minimal performance mode. Any part of the configuration of the failsafe device described in this paragraph can be combined with any other components of the example failsafe device inventions described in previous paragraphs above.

Furthermore, the internal combustion engine, gasoline or diesel, can be configured, for example, to operate without control by one or more computers and/or microprocessors, for example. In addition, the gasoline or diesel internal combustion engine can be configured to operate without electronic components when in an emergency, minimal performance mode as another example embodiment.

Alternatively, the internal combustion engine, whether gasoline or diesel, can be configured to operate without electronic components, for example. Any part of the configurations of the failsafe device described in this paragraph can be combined with any other components of the example failsafe device inventions described in previous paragraphs above.

As an additional invention example, when the above operation is a propulsion operation, the propulsion can be provided, all or in part, by said at least one internal combustion engine being configured to power one or more drive wheels to which the engine is connected by a transmission that includes at least one clutch; and the operation also can include a start operation when in an emergency, minimal performance mode; and the at least one clutch can be configured to operate at least by manual control of a driver. The failsafe device is configured to be capable of being jump started and/or to include a crank configured for manual operation by hand or external power to turn over said engine in order to start said engine. Any part of the configuration of the failsafe device example described in this paragraph can be combined with any other components of the example failsafe device inventions described in previous paragraphs above.

An additional example, when the operation is a steering operation and the steering is provided at least in part by at least in part a continuous mechanical connection configured to extend at least between a driver's steering wheel and the steering wheels of the vehicle. Any part of the configuration of the failsafe device example described in this paragraph can be combined with any other components of the example failsafe device inventions described in previous paragraphs above.

When the operation is a braking operation and said braking is provided at least in part by a continuous mechanical/hydraulic connection being configured to extend at least between a driver's brake pedal and the brakes of the vehicle. Any part of the configuration of the failsafe device example described in this paragraph can be combined with any other components of the example failsafe device inventions described in previous paragraphs above.

The device can be for example configured to perform an operation including at least a part or all of two or more of a mechanical system, a hydraulic system, an electrical system, and a chemical system. The device also can be configured to perform an operation including at least a part or all of three or more of a mechanical system, a hydraulic system, an electrical system, and a chemical system. And the device can be configured to perform an operation including at least a part or all of a mechanical system, a hydraulic system, an electrical system, and a chemical system. The device can be configured to perform an operation including at least a part or all of a mechanical system; the device can be configured to perform an operation including at least a part or all of a hydraulic system; the device can be configured to perform an operation including at least a part or all of an electrical system; and the device can be configured to perform an operation including at least a part or all of a chemical system. Any part of the configuration of the failsafe device examples described in this paragraph can be combined with any other components of the example failsafe device inventions described in previous paragraphs above.

The failsafe device can be configured to include one or more entertainment, navigation or other electronic systems, whether built into said device or a separate device, with at least one computer and/or microprocessor that do not control at least a part of the at least one non-electronic system; the one or more entertainment, navigation or other electronic systems are not connected to the one or more electronic systems with at least one computer and/or microprocessor that control the at least one non-electronic system. Any part of the configuration of the failsafe device examples described in this paragraph can be combined with any other components of the example failsafe device inventions described in previous paragraphs above.

The failsafe device can include at least a part or all of the at least one electronic system being controlled by at least one computer and/or microprocessor that is remotely located outside of said failsafe device. The failsafe device can also include at least a part or all of the at least one electronic system being controlled by at least one computer and/or microprocessor that is remotely located in at least one cloud-based computer system or other remote array of computer servers. In addition, the device can include at least a part or all of one or two or three or four of the systems of the device being controlled through the at least one electronic system by at least one computer and/or microprocessor that is remotely located in at least one cloud-based computer system or other remote array of computer servers. Furthermore, the device can include at least a part or all of one or two or three or more of the operations of the device being controlled through the at least one electronic system by at least one computer and/or microprocessor that is remotely located in at least one cloud-based computer system or other remote array of computer servers. Any part of the configuration of the failsafe device examples described in this paragraph can be combined with any other components of the example failsafe device inventions described in previous paragraphs above.

The failsafe device can be configured such that, when the device is being operated or started, an audible, visual, or other alarm and/or display can be triggered if a part or all of the electronic system malfunctions in part or fails completely, the alarm and/or display being provided to the operator of the device. Any part of the configuration of the failsafe device example described in this paragraph can be combined with any other components of the example failsafe device inventions described in previous paragraphs above.

A. A failsafe device configured to perform an operation including at least a part or all of one or more of a mechanical system, a hydraulic system, an electrical system, and a chemical system, comprising: at least one electronic system controlled by at least one computer and/or microprocessor; at least one non-electronic system, including at least one of said mechanical, hydraulic, electrical, or chemical systems; and said device being configured to operate in two modes; in a normal, maximal performance mode, said device is configured so that said operation is performed by said at least one non-electronic system when said at least one non-electronic system is controlled by said at least one electronic system; and in an emergency, minimal performance mode, when said at least one electronic system malfunctions at least partially, said device is configured so that said operation is still performed by said at least one non-electronic system.

B. The device of paragraph A, wherein in an emergency, minimal performance mode, when said at least one electronic system fails completely, said device is configured so that said operation is performed by said at least one non-electronic system alone.

C. The device of anyone of paragraphs A-B, wherein said device is configured to be a part of or to be itself a vehicle.

D. The device of anyone of paragraphs A-C, wherein said device is configured to be a part of or to be itself a hybrid electric vehicle (HEV) or an electric vehicle (EV).

E. The device of anyone of paragraphs A-B, wherein said device is configured to be a part of or to be itself a transportation vehicle, bicycle or bike, a motorcycle, a car or automobile, a sports utility vehicle, an off-road vehicle, a truck, a tank or other military vehicle, a weapon or weapons system, a bus, a farm vehicle, a construction or repair vehicle, a crane, a firefighting vehicle, a police or emergency vehicle, a train, a subway car, a boat with one or more hulls, a canoe, a ship, an airplane, a helicopter, a rocket, an elevator, a hand or other tool, a power tool, powered equipment, sports or recreation equipment, entertainment equipment, educational equipment, a safe and/or locking mechanism, a robot or robotic device, a prosthetic device, an implant device, a toy, a building or house, heating, cooling, or other equipment, a manufacturing process or equipment, an electrical system, an electrical power generation system, a wired or wireless telecommunications system, a sewage system, a water system, a radio or television system, a cloud computer system or other computer array, a factory, a delivery system, a laboratory, medical equipment, dental equipment, podiatric or orthotic equipment, a hospital or other medical treatment facility, a stadium, theater, or other entertainment facility, or footwear.

F. The device of anyone of paragraphs A-E, wherein said device is configured to perform said operation at a greater level of efficiency, speed, power, or effectiveness when said at least one non-electronic system is controlled by said at least one electronic system.

G. The device of anyone of paragraphs A-F, wherein said electronic system and/or said at least one computer and/or said at least one microprocessor is configured to be protected by a Faraday Cage.

H. The device of anyone of paragraphs A-G, wherein said at least one computer and/or microprocessor is configured to include one or more parts protected by one or more internal hardware access barriers or firewalls from access by an external network and/or the Internet.

I. The device of anyone of paragraphs A-H, wherein said at least one computer and/or microprocessor is configured to include a master or central controller of said at least one computer and/or microprocessor, said master or central controller protected by said one or more internal hardware access barriers or firewalls from access by an external network and/or the Internet.

J. The device of anyone of paragraphs A-I, wherein said operation includes one or more of a braking operation, a steering operation, a starting operation, a stopping operation, a gear shifting operation, an acceleration operation, a deceleration operation, a direction reversing operation, a propulsion operation, a drive train operation, a suspension operation, a wheel operation, a tire operation, a transmission operation, a battery operation, an ignition operation, a power generation operation, a meter operation, an alternator operation, an electrical motor operation, an internal combustion engine operation, a fuel cell operation, a steam engine operation, a lighting operation, a furnace operation, a heating and/or cooling operation, a lifting or loading operation, a pulling or pushing operation, a digging or burying operation, a pumping operation, a retail operation, a wholesale operation, a banking operation, an emissions and/or pollution control operation, or a safety system operation.

K. The device of anyone of paragraphs A-J, wherein said device is configured to provide an operator of said device with manual control of said operation using said at least one non-electronic system without control by said at least one electronic system when said at least one electronic system either malfunctions or fails.

L. The device of anyone of paragraphs A-K, wherein said device is configured to default automatically to perform said operation in said emergency minimal performance mode when said operation cannot be performed due to a malfunction or failure of said electronic system.

M. The device of anyone of paragraphs A-L, wherein said device is configured to include one or more internal sipes and/or one or more bladders, chambers, or compartments and/or computer control of said one or more bladders, chambers, or compartments.

N. The device of anyone of paragraphs A-M, wherein said operation is a propulsion operation and said propulsion is provided at least in part by at least one battery and/or at least one fuel cell being configured to power at least one electrical motor connected to one or more drive wheels.

O. The device of anyone of paragraphs A-N, wherein said operation is a propulsion operation and said propulsion is provided at least in part by at least one internal combustion engine being configured to be connected to at least one generator which charges at least one battery that powers at least one electrical motor connected to one or more drive wheels.

P. The device of anyone of paragraphs A-O, wherein said operation is a propulsion operation and said propulsion is provided at least in part by at least one internal combustion engine being configured to power one or more drive wheels to which said engine is connected.

Q. The device of anyone of paragraphs A-P, wherein said at least one internal combustion engine is a gasoline engine or a diesel engine and is configured to operate without control by one or more computers and/or microprocessors when in an emergency, minimal performance mode.

R. The device of anyone of paragraphs A-Q, wherein said internal combustion engine is a gasoline engine or a diesel engine and is configured to operate without control by one or more computers and/or microprocessors.

S. The device of anyone of paragraphs A-R, wherein said internal combustion engine is a gasoline engine or a diesel engine and is configured to operate without electronic components when in an emergency, minimal performance mode.

T. The device of anyone of paragraphs A-S, wherein said internal combustion engine is a gasoline engine or a diesel engine and is configured to operate without electronic components.

U. The device of anyone of paragraphs A-T, wherein said operation is a propulsion operation and said propulsion is provided at least in part by said at least one internal combustion engine that is configured to power one or more drive wheels to which said engine is connected by a transmission that includes at least one clutch; and wherein said operation also includes a start operation when in an emergency, minimal performance mode; said at least one clutch is configured to operate at least by manual control of a driver.

V. The device of anyone of paragraphs A-U, wherein said failsafe device is configured to be capable of being jump started and/or to include a crank configured for manual operation by hand or external power to turn over said engine in order to start said engine.

W. The device of anyone of paragraphs A-V, wherein said operation is a steering operation and said steering is provided at least in part by a continuous mechanical connection being configured to extend at least between a driver's steering wheel and the steering wheels of the vehicle.

X. The device of anyone of paragraphs A-W, wherein said operation is a braking operation and said braking is provided at least in part by a continuous mechanical/hydraulic connection being configured to extend at least between a driver's brake pedal and the brakes of the vehicle.

V. The device of anyone of paragraphs A-X, wherein the device is configured to perform an operation including at least a part or all of two or more of a mechanical system, a hydraulic system, an electrical system, and a chemical system.

Z. The device of anyone of paragraphs A-V, wherein the device is configured to perform an operation including at least a part or all of three or more of a mechanical system, a hydraulic system, an electrical system, and a chemical system.

AA. The device of anyone of paragraphs A-Z, wherein the device is configured to perform an operation including at least a part or all of a mechanical system, a hydraulic system, an electrical system, and a chemical system.

BB. The device of anyone of paragraphs A-AA, wherein the device is configured to perform an operation including at least a part or all of a mechanical system.

CC. The device of anyone of paragraphs A-BB, wherein the device is configured to perform an operation including at least a part or all of a hydraulic system.

DO. The device of anyone of paragraphs A-CC, wherein the device is configured to perform an operation including at least a part or all of an electrical system.

EE. The device of anyone of paragraphs A-DO, wherein the device is configured to perform an operation including at least a part or all of a chemical system.

FF. The device of anyone of paragraphs A-EE, wherein said failsafe device is configured to include one or more entertainment, navigation or other electronic systems, whether built into said device or a separate device, with at least one computer and/or microprocessor that do not control at least a part of said at least one non-electronic system; said one or more entertainment, navigation or other electronic systems are not connected to said one or more electronic systems with at least one computer and/or microprocessor that control said at least one non-electronic system.

GG. The device of anyone of paragraphs A-FF, wherein at least a part or all of said at least one electronic system is controlled by at least one computer and/or microprocessor that is remotely located outside of said failsafe device.

HH. The device of anyone of paragraphs A-GG, wherein at least a part or all of said at least one electronic system is controlled by at least one computer and/or microprocessor that is remotely located in at least one cloud-based computer system or other remote array of computer servers.

II. The device of anyone of paragraphs A-HH, wherein at least a part or all of one or two or three or four of said systems is controlled through said at least one electronic system by at least one computer and/or microprocessor that is remotely located in at least one cloud-based computer system or other remote array of computer servers.

JJ. The device of anyone of paragraphs A-II, wherein at least a part or all of one or two or three or more of said operations is controlled through said at least one electronic system by at least one computer and/or microprocessor that is remotely located in at least one cloud-based computer system or other remote array of computer servers.

KK. The device of anyone of paragraphs A-JJ, wherein the device is configured such that, when the device is being operated or started, an audible, visual, or other alarm and/or display will be triggered if a part or all of said electronic system malfunctions in part or fails completely, said alarm and/or display being provided to the operator of the device.

The applicant's U.S. Provisional Application Nos. 61/850,746, filed Feb. 22, 2013; 61/850,825, filed Feb. 25, 2013; 61/850,947, filed Feb. 27, 2013; 61/851,084, filed Mar. 1, 2013; 61/851,206, filed Mar. 4, 2013; and 61/852,039, filed Mar. 15, 2013 are hereby incorporated by reference herein in their entirely into this application.

Any of the above described example configurations and embodiments of the failsafe device inventions contained in this application can be combined with anyone or more of the other above described example invention configurations and embodiments also contained in this application or in the applicant's previous applications that have been incorporated by reference in this application.

The invention claimed is:

1. A failsafe automobile, comprising:
the automobile being capable of at least all of the following basic operations: a starting operation, a propulsion operation including an electrical motor operation and an internal combustion engine operation, a battery operation, a steering operation, a stopping operation, and a lighting operation; and
the automobile including at least one electronic system controlled by at least one computer and/or microprocessor;
at least the basic operations of the automobile having at least two different modes of operation:
a normal performance mode of each of the basic operations of the automobile, the normal performance mode being performed with control by the at least one electronic system, and
an emergency performance mode of each of the basic operations of the automobile, the emergency performance mode being performed without any control by the at least one electronic system,
each said emergency performance mode of the basic operations of the automobile being configured to perform when the at least one electronic system fails to control the normal performance mode of one or more of a same basic operation of the automobile,
each said emergency mode of operation being initiated by at least one of the following: automatically by default or by a manual switch activated by an operator of the automobile.

2. The automobile of claim 1, wherein when the at least one electronic system fails to control all of the basic operations of the automobile, all of said basic operations are performed in the emergency performance mode without the control by the at least one electronic system.

3. The automobile of claim 1, wherein when the at least one computer or microprocessor fails to control the at least one electronic system of the automobile, all of the basic operations are performed in the emergency performance mode without the control of the at least one electronic system by the at least one computer or microprocessor system.

4. The automobile of claim 1, wherein the basic operations of the automobile include a transmission operation.

5. The automobile of claim 1, wherein the basic operations of the automobile include a suspension operation.

6. The automobile of claim 1, wherein the basic operations of the automobile include a heating and/or cooling operation.

7. The automobile of claim 1, wherein the basic operations of the automobile include a safety system operation.

8. The automobile of claim 1, wherein the automobile is a hybrid electric vehicle.

9. The automobile of claim 1, wherein the propulsion operation is provided by the internal combustion engine operation.

10. The automobile of claim 1, wherein the basic operations of the automobile include a fuel cell operation.

11. The automobile of claim 1, wherein the emergency mode of operation is performed automatically by default.

12. The automobile of claim 1, wherein the emergency mode of operation is activated at least by the manual switch activated by the operator of the automobile.

13. The automobile of claim 1, wherein the automobile includes a crank configured for manual operation.

14. A failsafe automobile, comprising:
the automobile being capable of at least all of the following basic operations: a starting operation, a propulsion operation including an electrical motor operation and an internal combustion engine operation, a steering operation, a stopping operation, a lighting operation, a battery operation, a heating operation, a cooling operation, and a safety operation; and
the automobile including at least one electronic system controlled by at least one computer and/or microprocessor;
at least the basic operations of the automobile having at least two different modes of operation:
a normal performance mode of each of the basic operations of the automobile, the normal performance mode being performed with control by the at least one electronic system, and
an emergency performance mode of each of the basic operations of the automobile, the emergency performance mode being performed without any control by the at least one electronic system, each of the emergency performance modes of operation of the basic operations of the automobile being configured to perform when the at least one electronic system fails to control the normal performance mode of the same basic operation of the automobile,
the emergency mode of operation being initiated by at least one of the following: automatically by default or by a manual switch activated by an operator of the automobile.

15. The automobile of claim 14, wherein when the at least one electronic system fails to control all of the basic operations of the automobile, all of said basic operations are performed in the emergency performance mode without the control by the at least one electronic system.

16. The automobile of claim 14, wherein the automobile includes a crank configured for manual operation.

17. The automobile of claim 14, wherein the automobile is a hybrid electric vehicle.

18. The automobile of claim 14, wherein the propulsion operation is provided by the internal combustion engine operation.

19. The automobile of claim 14, wherein the emergency mode of operation is performed automatically by default.

20. The automobile of claim 14, wherein the emergency mode of operation is activated at least by the manual switch activated by the operator of the automobile.

* * * * *